US010215610B2

(12) United States Patent
Blödt

(10) Patent No.: US 10,215,610 B2
(45) Date of Patent: Feb. 26, 2019

(54) APPARATUS FOR ASCERTAINING AND MONITORING A FILL LEVEL

(71) Applicant: Endress+Hauser GmbH+Co. KG, Maulburg (DE)

(72) Inventor: Thomas Blödt, Steinen (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 8 days.

(21) Appl. No.: 15/550,226

(22) PCT Filed: Jan. 27, 2016

(86) PCT No.: PCT/EP2016/051679
§ 371 (c)(1),
(2) Date: Aug. 10, 2017

(87) PCT Pub. No.: WO2016/128216
PCT Pub. Date: Aug. 18, 2016

(65) Prior Publication Data
US 2018/0031406 A1 Feb. 1, 2018

(30) Foreign Application Priority Data

Feb. 12, 2015 (DE) .................. 10 2015 102 002

(51) Int. Cl.
*G01S 13/34* (2006.01)
*H01Q 13/02* (2006.01)
(Continued)

(52) U.S. Cl.
CPC ........... *G01F 23/284* (2013.01); *H01Q 1/225* (2013.01); *H01Q 13/02* (2013.01); *H01Q 13/025* (2013.01)

(58) Field of Classification Search
CPC .... G01F 23/284; H01Q 13/02; H01Q 13/025; H01Q 1/225
(Continued)

(56) References Cited

U.S. PATENT DOCUMENTS

| 4,503,433 A | 3/1985 | Tomasi |
| 2005/0179584 A1 | 8/2005 | Ohlsson |

(Continued)

FOREIGN PATENT DOCUMENTS

DE  102012109101 A1  3/2014

OTHER PUBLICATIONS

Search Report for German Patent Application No. 10 2015 102 002.5, German Patent Office, dated Dec. 9, 2015, 5 pp.
(Continued)

*Primary Examiner* — Farhana Hoque
(74) *Attorney, Agent, or Firm* — Mark A. Logan; PatServe

(57) ABSTRACT

The invention relates to an apparatus for transmitting and receiving electromagnetic waves (EM waves) for ascertaining and monitoring a fill level of a medium in a container, comprising a first hollow conductor with a first coupling element for the out- and in-coupling of EM waves, a second hollow conductor with a second coupling element for the out- and in-coupling of EM waves, a horn radiator for radiating and focusing of EM waves, wherein the first and second hollow conductors are dimensioned such that EM waves out-coupled from the first and second coupling elements radiate from the horn radiator scattered and with weak intensity, or scattered and weak intensity EM waves, which are received from the horn radiator, couple to the first and second coupling elements, and EM waves out-coupled only from the first coupling element radiate from the horn radiator focused and with strong intensity, or focused and strong
(Continued)

intensity EM waves, which are received from the horn radiator couple only to the first coupling element.

12 Claims, 2 Drawing Sheets

(51) Int. Cl.
*G01F 23/284* (2006.01)
*H01Q 1/22* (2006.01)

(58) Field of Classification Search
USPC .................................. 324/644; 342/124, 87
See application file for complete search history.

(56) References Cited

U.S. PATENT DOCUMENTS

2009/0289835 A1* 11/2009 Edvardsson .......... G01F 23/284
                                                              342/124
2011/0050527 A1    3/2011 Anderson et al.
2012/0137768 A1    6/2012 Edvardsson

OTHER PUBLICATIONS

Search Report for International Patent Application No. PCT/EP2016/051679, WIPO, dated May 23, 2016, 14 pp.

* cited by examiner

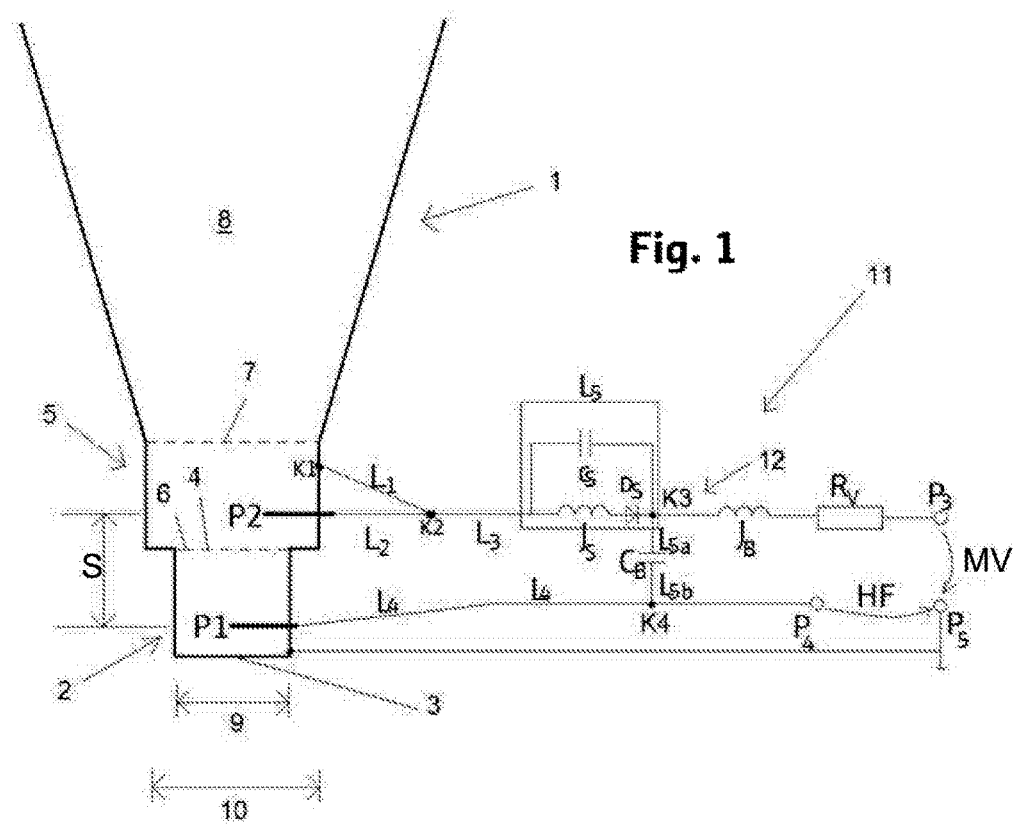
Fig. 1
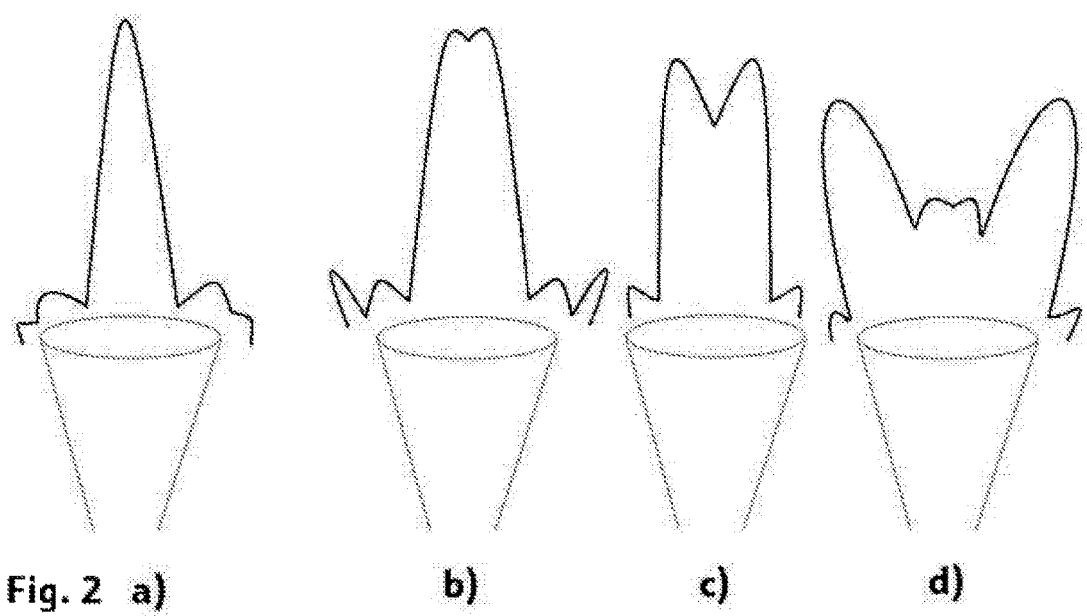
Fig. 2 a)   b)   c)   d)

APPARATUS FOR ASCERTAINING AND MONITORING A FILL LEVEL

CROSS-REFERENCE TO RELATED APPLICATIONS

The present application is related to and claims the priority benefit of German Patent Application No. 10 2015 102 002.5, filed on Feb. 12, 2015 and International Patent Application No. PCT/EP2016/051679, filed Jan. 27, 2016, the entire contents of which are incorporated herein by reference.

TECHNICAL FIELD

The invention relates to an apparatus for transmitting and receiving electromagnetic waves (EM waves) for ascertaining and monitoring a fill level of a medium in a container by means of travel times of EM waves.

BACKGROUND

Conventional pulse radar, fill level measuring devices have regularly a transmission system having a pulse producing system connected to a control unit. The pulse producing system produces for each measurement a transmission signal, which is composed of microwave pulses of a fixedly predetermined center frequency and a predetermined pulse repetition rate. The microwave pulses have, for example, fixedly predetermined center frequencies of 26 GHz or 78 GHz. The antenna is mounted on the container above the highest fill level to be measured, oriented toward the fill substance and sends the transmission signals into the container. Subsequently, the antenna receives as received signals the signal fractions reflected on the fill substance back toward the fill-level measuring device after a travel time dependent on the distance to the fill substance. The received signals are fed to a signal processing system connected to the transmission system and to the antenna, and the signal processing system determines the fill level based on the received signals.

In such case, measurement curves are regularly derived, which show the amplitudes of the received signals as a function of their travel time required for the path to the fill substance and back. From the travel times of the peaks of these measurement curves, then, based on the propagation velocity of the microwave pulses, the distance of the fill substance from the fill-level measuring device can be determined.

For fill level measurement today, a large number of different evaluation methods, frequently referred to as echo recognition methods, are applied, with which the measurement curves are used to ascertain which peak is to be attributed to the reflection on the surface of the fill substance. For example, the first occurring peak or the peak having the greatest amplitude can be selected as the peak of the particular measurement curve to be attributed to the reflection on the surface of the fill substance. From the travel time associated with this peak, based on the propagation velocity of the microwave pulses, the distance of the surface of the fill substance from the fill-level measuring device is derived, which then, based on the installed height of the antenna, is convertible into the fill level—thus the fill level of the fill substance in the container.

These fill level measuring devices deliver reliable measurement results in a large number of different applications. For fill level measurement of bulk goods, however, such measuring devices are, as a rule, not optimally suitable, since bulk goods regularly form hill and valley shaped bulk goods cones, whose surface profile is not registered with these fill-level measuring devices, so that a surface profile cannot be taken into consideration for the fill level determination.

Likewise, in given cases, problematic is the use of conventional fill level measuring devices with a single, rigidly mounted antenna in applications, in which objects (hereinafter referred to as disturbances) installed in the container protrude laterally into the beam path of the transmission signals. Thus objects, such as other measuring devices or filling nozzles, are present.

DE 102012109101 A1 describes a fill-level measuring device for measuring a fill level of a fill substance in a container. Such fill-level measuring device includes an antenna, which sends transmission signals with different center frequencies into the container, and receives as received signals their signal fractions reflected back in the container in the direction of the antenna. Furthermore, the antenna has different spatial radiation characteristics for different center frequencies depending on the center frequencies of the transmission signals. A signal processing system evaluates the received signals based on the center frequencies of the microwave pulses of the associated transmission signals and the center frequency dependence of the spatial radiation characteristics of the antenna.

Disadvantageous in the case of such a fill-level measuring device is that the center frequencies of the transmission signals must be changed, in order to change the radiation characteristics of the microwave pulses of the transmission signals. That means that the transmission signals of such fill-level measuring devices are broadband signals.

Fill level measuring devices with broadband transmission signals are not able to resolve the separation between the antenna and the fill substance finely and therefore are not able to determine the fill level as exactly as might be desired.

SUMMARY

An object of the invention is to provide an apparatus, which can determine the fill level of a medium in a container precisely.

The object is achieved by the subject matter of the invention. The subject matter of the invention is an apparatus for transmitting and receiving electromagnetic waves (EM waves) for ascertaining and monitoring a fill level of a medium in a container by means of travel times of EM waves. The apparatus comprises a first hollow conductor with a first coupling element for the out- and in-coupling of EM waves, wherein a first end face of the first hollow conductor is closed and a second end face of the first hollow conductor is open, so that EM waves, which out-couple via the first coupling element, are transmitted across the second end face, and EM waves, which are received across the second end face of the first hollow conductor, in-couple to the first coupling element, at least a second hollow conductor with a second coupling element for the out- and in-coupling of EM waves, wherein first and second end faces of the second hollow conductor are open, and wherein the first end face of the second hollow conductor borders on the second end face of the first hollow conductor, so that EM waves transmitted from the first hollow conductor are transferred by the second hollow conductor and EM waves transferred by the second hollow conductor are received by the first hollow conductor, a horn radiator for radiating and focusing of EM waves, wherein an intake opening of the horn radiator communicates with the second end face of the second hollow conductor, so that EM waves transmitted from the second hollow conductor are radiated from the horn radiator and EM waves received by the horn radiator are focused into the second hollow conductor, wherein the first hollow conductor is embodied in such a way that first electromagnetic wave modes are producible in the first hollow conductor, wherein the second hollow conductor is embodied in such a way that second electromagnetic wave modes are producible in the second hollow conductor, wherein the first and second hollow conductors are dimensioned in such a way that EM waves out coupled from the first and second coupling elements radiate from the horn radiator scattered and with weak intensity, or scattered and weak intensity EM waves, which are received by the horn radiator, couple to the first and second coupling elements, and EM waves out-coupled only from the first coupling element radiate from the horn radiator focused and with strong intensity, or focused and strong intensity EM waves, which are received by the horn radiator, couple only to the first coupling element.

A weaker focusing is achieved by a second, optionally added mode, which by superpositioning on a first fundamental mode results in a spreading of the radiation lobe. This second wave mode can be added by a small control voltage MV. The control voltage MV amounts to few volts (e.g. 1 . . . 4 V) and the electrical current draw required in such case lies in the micro-ampere range or lower.

By switching between narrow and wide lobes—especially in the case of embodiments with adjustable broadening—some disturbances can be identified as regards distance, since these in the case of narrow lobe less appear strongly or even do not appear, as compared with the wide lobe case. This is beneficial especially in the case of radar systems with rather lower operating frequency (e.g. 6 GHz or 10 GHz). Such a switching is beneficial in the case of wave surfaces, and disturbing, installed objects in the case of low fill levels as well as in the case of plausibility calculations in the case of reclined, cylindrical tanks, which produce strong reflections. Furthermore, an option is periodically to register the complete measuring range using a broad lobe, and, especially with a FMCW radar system, then to register exactly with narrow lobe only the distance range, in which the fill level is to be expected.

In an advantageous further development, the first hollow conductor is at least partially filled with at least a first dielectric material and/or the second hollow conductor is at least partially filled with at least a second dielectric material. In this way, hollow conductors with smaller diameters can be used. Additionally, a protective cap on the broad end of the horn can be omitted, since the in-coupling element is sealed by the filling material.

In an advantageous further development, the at least first material has a smaller dielectric constant than the at least second material. In order by means of the apparatus of the invention to irradiate a large region, it is advantageous to choose the diameter of the second hollow conductor greater than the diameter of the first hollow conductor. If the second hollow conductor is filled with a dielectric material, then it can be dimensioned smaller. In this way, the diameters of the first and second hollow conductors can be selected to be equal, whereby the apparatus is simpler to manufacture and the first and second coupling elements are located in a shared plane. In this way, the first and second coupling elements can be arranged on lands of a single circuit card, in which case the circuit card extends to the antenna apparatus.

In an advantageous variant, a ratio between the at least second dielectric constant and the at least first dielectric constant is about 2.5. In this way, the diameter of the first and second hollow conductors can be selected to be equal, wherein the difference between the smallest possible radiation angle and the greatest possible radiation angle can be enlarged.

In an advantageous variant, a separation S between the first and second coupling elements in a transmission direction of the EM waves corresponds to $\frac{3}{4}\lambda + n \times \lambda/2$, in the case of which $\lambda$ is the wavelength of the EM waves and n is a natural number 0, 1, 2, . . . . In this way, a constructive superpositioning of the waves out- or in-coupled via the first and second coupling elements results.

In an advantageous form of embodiment, a length of the first coupling element amounts at most to $\lambda/4$ and a length of the second coupling element amounts at most to $\lambda/2$. By setting upper limits of the lengths of the first and second coupling elements, it is achieved that in the first coupling element as much as possible a fundamental mode is excited and in the second coupling element a mode of higher order is excited. Another dimensioning of the first and second coupling elements would give a less favorable reflection at the first end face of the first hollow conductor.

In an advantageous form of embodiment, the first coupling element includes a first terminal for transferring of EM waves, which out- or in-couple at the first coupling element, wherein the second coupling element includes a second terminal for transferring of EM waves, which out- or in-couple at the second coupling element, wherein between the first and second terminals a voltage divider, especially a capacitive voltage divider, is provided, such that the voltage divider determines the dividing of the EM waves between the first and second coupling elements.

In an advantageous embodiment, the voltage divider includes an electrical capacitance and a bandpass filter. The dividing of the electrical power between the first coupling element and the second coupling element can be set by the ratio of the impedance of the second capacitance to the impedance of the bandpass filter.

In an advantageous embodiment, the voltage divider includes a second capacitance and a semiconductor element, preferably a diode, especially preferably a varactor diode. The diode is advantageously a capacitance diode. The diode is typically so constructed that the electrical capacitance of the diode changes especially as a function of the size of the reverse bias. Since the ratio of the second capacitance to the capacitance of the bandpass filter governs the dividing of the power between the first and second coupling elements, thus, variation of the reverse bias voltage can tune the dividing of the power between the first and second coupling elements. The second capacitance acts as highpass filter, i.e. it is a barrier for the reverse bias voltage but lets wave signals pass.

In an advantageous variant, the voltage divider includes a second capacitance and an oscillatory circuit. Instead of a bandpass filter, an oscillatory circuit can also be used. An oscillatory circuit is distinguished by a very large change of amplitude as a function of frequency, in case the frequency is selected to be in the range including the resonant frequency. In this way, with a small capacitance change—and, thus, a small maximum reverse bias voltage on a diode—a large variation of the dividing of the power between the first and second coupling elements and, thus, variation of the radiation angle of the EM waves can be achieved. In order at equal voltage change to bring about a greater capacitance change in the diode, also a diode with stronger doping can be used.

BRIEF DESCRIPTION OF THE DRAWINGS

The invention will now be explained in greater detail based on the appended drawing, the figures of which show as follows:

FIG. 1 shows a schematic view of an apparatus 1 of the invention for transmitting and receiving EM waves, including an electrical circuit for operation of the apparatus 1, FIGS. 2a-2d show schematic views of radiations of EM waves from an apparatus 1 as in FIG. 1 in the case of different designs of the electrical circuit.

DETAILED DESCRIPTION

Figure 3:
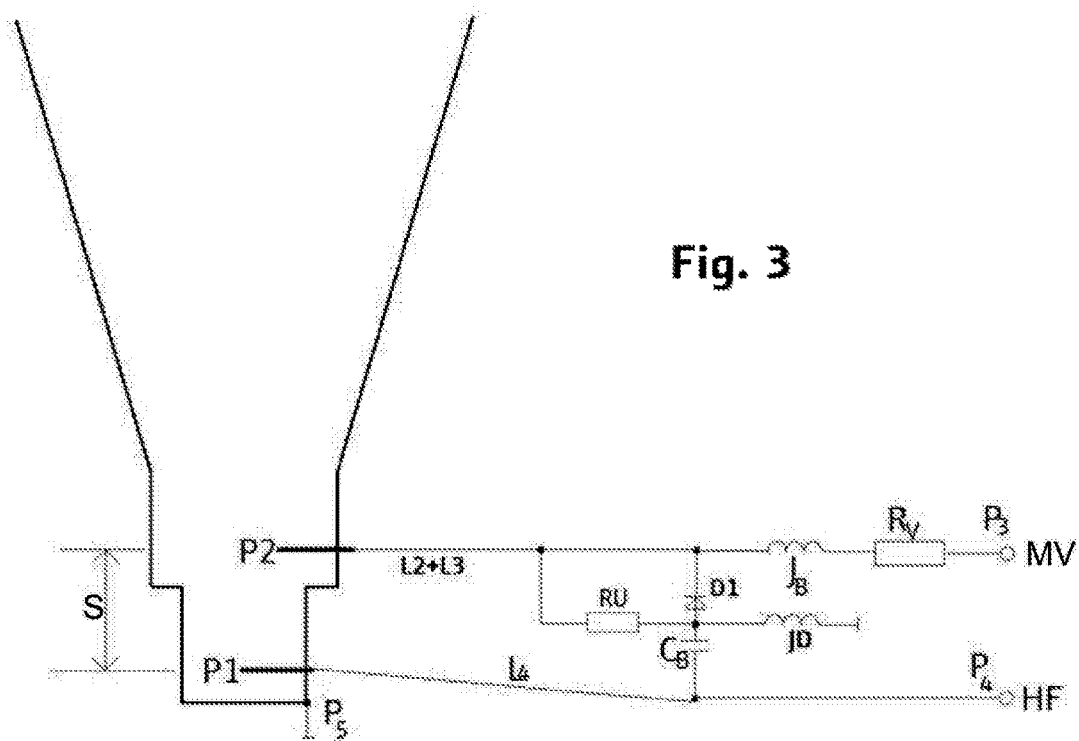
FIG. 3 shows a schematic view of an additional embodiment of the apparatus 1, in the case of which a voltage divider of the electrical circuit is capacitive.

FIG. 1 shows an apparatus of the invention 1 for transmitting and receiving electromagnetic waves (EM waves) for ascertaining and monitoring a fill level of a medium (not shown) in a container (not shown) by means of travel times of EM waves. Apparatus 1 includes a first hollow conductor 2 with a first coupling element P1 for the out- and in-coupling of electromagnetic waves, wherein a first end face 3 of the first hollow conductor 2 is closed and a second end face 4 of the first hollow conductor 2 is open. In this way, EM waves, which out-couple via the first coupling element P1, can be transmitted via the second end face and EM waves, which are received via the second end face of the first hollow conductor 4, can in-couple at the first coupling element P1. The first hollow conductor 2 is cylindrically embodied and has a diameter, which is dimensioned in such a manner that only a fundamental mode is excited. Preferably the fundamental mode is a mode with a very low cutoff frequency, especially a TE01 mode. The first hollow conductor 2 can, however, also have an elliptical, quadratic, n-polygonal or u-shaped footprint.

Furthermore, the apparatus 1 includes a second hollow conductor 5 with a second coupling element P2 for the out- and in-coupling of EM waves, wherein the first and second end faces 6, 7 of the second hollow conductor 5 are open. In such case, the first end face 6 of the second hollow conductor 5 borders the second end face 4 of the first hollow conductor 2, so that EM waves transmitted from the first hollow conductor 2 are transferred by the second hollow conductor 5 and EM waves transferred by the second hollow conductor 5 are received by the first hollow conductor 2. The second hollow conductor 5 can be cylindrically embodied. The second hollow conductor 5 can have a footprint, which is square, elliptical, n-polygonal or u-shaped. The second hollow conductor 5 is designed in such a manner that a higher mode is excited than the mode in the first hollow conductor 2. The higher modes can be e.g. a TM11-, TE21-, TE11- or TM21 mode.

Furthermore, the apparatus 1 includes a widened horn radiator 8 for radiating, receiving and focusing of EM waves. An intake opening of the horn radiator 8 communicates with the second end face 7 of the second hollow conductor 5, so that EM waves transferred from the second hollow conductor 5 are radiated from the horn radiator 8 and EM waves received by the horn radiator 8 are focused into the second hollow conductor 2.

The first hollow conductor 2 is embodied in such a way that first electromagnetic wave modes are producible in the first hollow conductor 2 and the second hollow conductor 5 is embodied in such a way that second electromagnetic wave modes are transferable in the second hollow conductor 5.

The first and second hollow conductors 2, 5 are designed in such a way that EM waves out-coupled from the first and second coupling elements P1, P2 superimpose and radiate scattered and with weak intensity from the horn radiator 8, respectively scattered and weak intensity EM waves, which are received by the horn radiator 8, couple into the first and second coupling elements P1, P2. EM waves out-coupled solely from the first coupling element P1 radiate focused and with strong intensity from the horn radiator 8, and focused and strong intensity EM waves, which are received by the horn radiator 8, couple to the first coupling element P1.

Furthermore, the first hollow conductor 2 is filled with a first dielectric material and the second hollow conductor 5 is filled with a second dielectric material. The first dielectric material can be air from the environment. Alternatively, the first hollow conductor can be evacuated. The second dielectric material has a dielectric constant, which is 2.5-times greater than the dielectric constant of the first material.

A separation S between the first and second coupling elements P1, P2 in the transmission direction of the EM waves equals $3/4\lambda + n \times \lambda/2$, wherein $\lambda$ is the wavelength of the EM waves and n is a natural number 0, 1, 2, .... A length of the first coupling element P1 amounts to $\lambda/4$ and a length of the second coupling element P2 amounts to $\lambda/2$.

Furthermore, the apparatus 1 includes an electrical circuit 11 for operating the apparatus 1. The electrical circuit 11 will now be described in greater detail. Leading from a first node K1 of the second hollow conductor 5 to a second node K2 is a first electrical line L1. A second line L2 connects the second node K2 with the second coupling element P2. A third line L3 connects the second node K2 with a first inductance JS, wherein the first inductance JS is connected via a diode DS to a third node K3. A first capacitance CS is connected parallel to the first inductance JS and the diode DS. The first capacitance CS and the first inductance JS and the diode DS form together a bandpass filter L5.

The third node K3 is connected via a second inductance JB and a limiting resistor RV to a first terminal P3.

A fourth line L4 connects the first coupling element P1 with a fourth node K4, wherein the fourth node K4 is connected to a second terminal P4.

Via a second capacitance CB, the third node K3 is connected with the fourth node K4.

The bandpass filter L5 forms with the second capacitance CB a capacitive voltage divider 12. Size of the second capacitance CB determines the powers sent to the first and second coupling elements P1, P2. Due to the greater diameter of the second hollow conductor 5, a higher mode is excited in the hollow conductor 5 than in the first hollow conductor 2. The higher mode of the second hollow conductor 5 is expanded at the output of the horn antenna 8 to a broad lobe.

The bandpass filter L5 acts as a band blocking filter, whereby no power reaches the second coupling element P2. The limiting resistor RV is high resistance, whereby no power can drain via the second terminal P4. The lengths of the first to fourth lines L1-L4 are listed in the table below.

| line/distance | length/size ($\lambda$ = wavelength) | |
|---|---|---|
| S - distance between the first and second coupling element | $\tfrac{3}{4}\lambda + n * \lambda/2$; | $n = 0, 1, 2 \ldots$ |
| L1 - first line antenna horn | $n * \lambda/2$ | $n = 1, 2, 3 \ldots$ |
| L2 - second line | $(n + 1/2) * \lambda$ | $n = 0, 1, 2 \ldots$ |
| L3 - third line | $(n + 1/2) * \lambda$ | $n = 0, 1, 2 \ldots$ |
| L4 - fourth line | $n * \lambda$ | $n = 1, 2, 3 \ldots$ |
| travel path via the bandpass filter L5 | $n * \lambda/2$ | $n = 1, 2, 3 \ldots$ |
| length of the second capacitance CB | $n * \lambda/2$ | $n = 1, 2, 3 \ldots$ |
| length of the first coupling element | $\leq \lambda/4$ | |
| length of the second coupling element | $\leq \lambda/4$ or $\leq \lambda/2$ | |

In order to produce focused and strong intensity EM waves, a high frequency signal HF is applied to the second terminal P4. The high frequency signal HF is transferred via the fourth line L4 to the first coupling element P1 and radiated monomodally (only one mode is predominant in the radiation) via the horn radiator 8.

Placed on the first terminal P3 of the apparatus 1 is a control voltage MV, which affects the cathode of the diode DS via the limiting resistor RV and the second inductance JB. Since an anode of the diode DS is connected via the first inductance JS and the first line L1 with the second hollow conductor 5, and, from there, with the third terminal P5 (signal ground potential), the control voltage MV affects the diode DS. Because the control voltage is acting in the reverse direction of the diode DS, only a very smaller electrical current flows through the first line L1. With voltage applied in the reverse direction, the diode DS acts as a capacitance, whereby the bandpass filter L5 determines the pass frequency for the operating frequency of the apparatus 1.

FIG. 2a shows the radiation of EM waves, which are out-coupled only from the first coupling element P1 (one-mode operation) and radiate focused and with strong intensity from the horn radiator 8.

FIGS. 2b, 2c, and 2d each show radiations of EM waves, which result from the superpositioning of the EM waves out-coupled from the first and second coupling elements P1, P2 and from the design of the voltage divider (see FIG. 1 and description for FIG. 1). Switching between the radiation of FIG. 2a and the radiations of FIGS. 2b, 2c, and 2d can occur by means of an analog or digital control voltage MV.

FIG. 3 shows another embodiment, in the case of which the voltage divider 12 is capacitive and formed only of CB and D1. In this way, a stepless transition from the radiation of FIG. 2a to the radiations of FIGS. 2b-d can be produced as a function of the control voltage MV, wherein without applied control voltage MV the radiation of FIG. 2a is achieved and with increasing control voltage MV the radiation changes more and more in the direction of the radiation of FIG. 2d. Since diode D1 is very high resistance, and also in order to enable a fast switching from d) back to a), an optional very high ohm (10 . . . 100 MOhm or more) resistor RU is provided, through which the capacitance (in the range to a few pF) formed with the diode D1 can be discharged.

Figure 4:
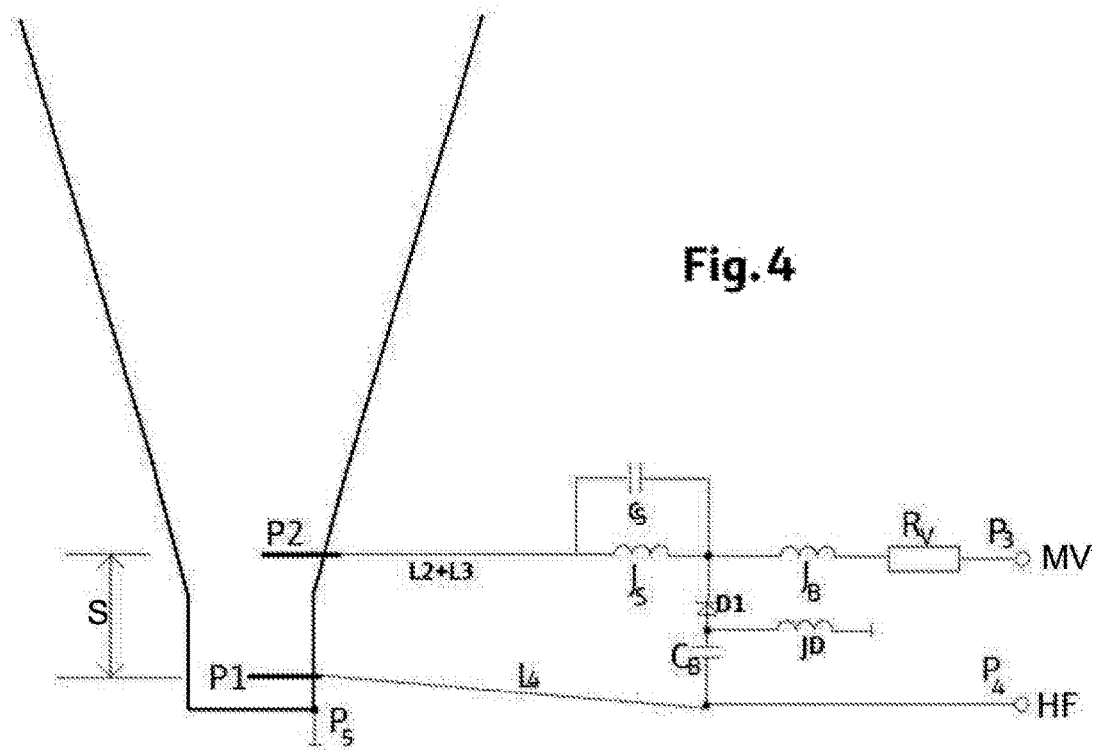
FIG. 4 shows a schematic view of an additional embodiment of the apparatus 1, in the case of which the horn radiator is conically embodied.

FIG. 4 shows another embodiment of the apparatus of the invention, which differs from the apparatus of FIG. 3 by a simplified electrical circuit 11. Instead of an impedance-based, capacitive voltage divider and bandpass filter or capacitance and resonance circuit, the impedance-based voltage divider here is formed of a diode D1 and the second capacitance CB. The second capacitance CB represents a barrier for the control voltage MV equivalent to the barrier provided by the diode D1. An inductance JD connects the diode D1 with the signal ground potential on the terminal P5. An apparatus of the invention with an electrical circuit 11 is, as a whole, cost effective to implement.

In all examples of embodiments shown in FIGS. 1 to 4, the transmission of EM waves of the apparatus 1 has been described. The receiving of EM waves by the apparatus 1 is analogous to the transmission of the EM waves.

LIST OF REFERENCE CHARACTERS 1 apparatus
2 first hollow conductor
3 first end face of the first hollow conductor
4 second end face of the first hollow conductor
5 second hollow conductor
6 first end face of the second hollow conductor
7 second end face of the second hollow conductor
8 horn radiator
9 first diameter
10 second diameter
11 electrical circuit
12 voltage divider
S separation
P1 first coupling element
P2 second coupling element
$\lambda$ wavelength of the EM wave
n natural number 0, 1, 2, . . . .
P3 first terminal
P4 second terminal
P5 third terminal
DS diode
CS first capacitance
JS first inductance
CB second capacitance
JB second inductance
RV limiting resistor
K1 first node
K2 second node
K3 third node
K4 Fourth node
L1 first line
L2 second line
L3 third line
L4 fourth line
L5 bandpass filter
RU resistor
JD inductance

The invention claimed is:
1. An apparatus for transmitting and receiving electromagnetic waves (EM waves), comprising:
a first hollow conductor including a first coupling element embodied to out-couple and to in-couple EM waves, the first hollow conductor having a first end face that is closed and a second end face that is open, so that EM waves that out-couple via the first coupling element are transmitted via the second end face, and so that EM waves that are received via the second end face in-couple to the first coupling element;
a second hollow conductor including a second coupling element embodied to out-couple and to in-couple EM waves, the second hollow conductor having a first end face that is open and a second end face that is open, wherein the first end face of the second hollow conductor borders on the second end face of the first hollow conductor, so that EM waves transmitted from the first hollow conductor are transferred by the second hollow conductor, and so that EM waves transferred by the second hollow conductor are received by the first hollow conductor; and a horn radiator embodied to radiate and to focus EM waves, wherein an intake opening of the horn radiator communicates with the second end face of the second hollow conductor, so that EM waves transmitted from the second hollow conductor are radiated from the horn radiator, and so that EM waves received from the horn radiator are focused into the second hollow conductor, wherein the first hollow conductor is embodied such that first electromagnetic wave modes are producible in the first hollow conductor, wherein the second hollow conductor is embodied in such a way that second electromagnetic wave modes are producible in the second hollow conductor, wherein the first hollow conductor and the second hollow conductor are dimensioned such that: EM waves out-coupled from the first coupling element and the second coupling element radiate from the horn radiator scattered and having a weak intensity; scattered and weak intensity EM waves that are received from the horn radiator couple to the first and second coupling elements; EM waves out-coupled only from the first coupling element radiate from the horn radiator focused and having a strong intensity; and focused and strong intensity EM waves that are received from the horn radiator couple only to the first coupling element.

2. The apparatus as claimed in claim 1, wherein the first hollow conductor is at least partially filled with a first dielectric material and the second hollow conductor is at least partially filled with a second dielectric material.

3. The apparatus as claimed in claim 2, wherein a dielectric constant of the first dielectric material is smaller than a dielectric constant of the second dielectric material.

4. The apparatus as claimed in claim 3, wherein a ratio between the dielectric constant of the second dielectric material and the dielectric constant of the first dielectric material is about 2.5 to 1.

5. The apparatus as claimed in claim 1, wherein a separation between the first coupling element and the second coupling element in a transmission direction of the EM waves corresponds to $¾\lambda + n \times \lambda/2$, wherein $\lambda$ is a wavelength of the EM waves and n is a natural number 0, 1, 2, . . . .

6. The apparatus as claimed in claim 1, wherein a length of the first coupling element is less than or equal to $\lambda/4$ and a length of the second coupling element is less than or equal to $\lambda/2$, wherein $\lambda$ is a wavelength of the EM waves.

7. The apparatus as claimed in claim 1, wherein the first coupling element includes a first terminal embodied to transfer EM waves that out-couple or in-couple at the first coupling element, and wherein the second coupling element includes a second terminal embodied to transfer EM waves that out-couple or in-couple at the second coupling element, the apparatus further comprising a voltage divider disposed between the first terminal and the second terminal and embodied to divide the EM waves between the first coupling element and the second coupling element.

8. The apparatus as claimed in claim 7, wherein the voltage divider includes an electrical capacitance and a bandpass filter.

9. The apparatus as claimed in claim 7, wherein the voltage divider includes a capacitance and a diode.

10. The apparatus as claimed in claim 9, wherein the diode is a varactor diode.

11. The apparatus of claim 7, wherein the voltage divider includes a capacitance and an oscillatory circuit.

12. The apparatus as claimed in claim 7, wherein the voltage divider is a capacitive voltage divider.

* * * * *